(12) United States Patent
Jitsui

(10) Patent No.: US 11,650,442 B1
(45) Date of Patent: May 16, 2023

(54) ELECTRONIC DEVICE

(71) Applicant: InnoLux Corporation, Miao-Li County (TW)

(72) Inventor: Kazuto Jitsui, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/510,676

(22) Filed: Oct. 26, 2021

(51) Int. Cl.
| | |
|---|---|
| G02F 1/13 | (2006.01) |
| G02F 1/1343 | (2006.01) |
| G02F 1/1335 | (2006.01) |
| G02F 1/139 | (2006.01) |
| G02F 1/01 | (2006.01) |
| G02F 1/1347 | (2006.01) |
| G02F 1/1337 | (2006.01) |

(52) U.S. Cl.
CPC .......... *G02F 1/1323* (2013.01); *G02F 1/0136* (2013.01); *G02F 1/1347* (2013.01); *G02F 1/1393* (2013.01); *G02F 1/1396* (2013.01); *G02F 1/13475* (2013.01); *G02F 1/133541* (2021.01); *G02F 1/133742* (2021.01); *G02F 1/134309* (2013.01); *G02F 2202/043* (2013.01)

(58) Field of Classification Search
CPC ............. G02F 1/1323; G02F 1/133528; G02F 1/1347; G02F 1/13475; G02F 1/13737; G02F 2202/04; G02B 5/3016
See application file for complete search history.

(56) References Cited

U.S. PATENT DOCUMENTS

| | | | | |
|---|---|---|---|---|
| 2006/0158590 | A1* | 7/2006 | Matsushima | G02F 1/1323 349/117 |
| 2006/0164571 | A1* | 7/2006 | Broer | G02B 5/3033 349/98 |
| 2010/0128200 | A1* | 5/2010 | Morishita | G02F 1/13363 349/62 |
| 2019/0025624 | A1* | 1/2019 | Petelin | C09K 19/0208 |
| 2019/0353943 | A1* | 11/2019 | Smith | G02F 1/134309 |

FOREIGN PATENT DOCUMENTS

| | | |
|---|---|---|
| CN | 1727916 A | 2/2006 |
| CN | 111929943 A * | 11/2020 |

* cited by examiner

*Primary Examiner* — Jessica M Merlin
(74) *Attorney, Agent, or Firm* — McClure, Qualey & Rodack, LLP

(57) ABSTRACT

An electronic device is provided. The electronic device includes a privacy module. The privacy module includes a first polarizing element, a second polarizing element, and a light modulation element. The first polarizing element includes a first light absorbing material. The first polarizing element has a surface, and the surface has a normal direction. The second polarizing element includes a second light absorbing material. The second polarizing element at least partially overlaps the first polarizing element. The light modulation element is disposed between the first polarizing element and the second polarizing element. The first light absorbing material has a first long axis, and the second light absorbing material has a second long axis. The first long axis and second long axis are parallel to the normal direction.

18 Claims, 8 Drawing Sheets

ELECTRONIC DEVICE

BACKGROUND OF THE INVENTION

Field of the Invention

The present disclosure relates to an electronic device, and in particular to a display device that includes a privacy module.

Description of the Related Art

Electronic devices such as a mobile phone or a tablet computer are commonly used. Currently, some electronic devices can adjust the angle at which the screen is visible, reducing the angle at which the screen of the display device can be seen by persons other than the user, thereby helping to protect the user's privacy.

Recently, privacy displays have been developed for several uses, such as for automotive displays, computer notebook displays, personal computer (PC) monitors, automated teller machine (ATM) displays, etc. Current privacy displays can make the displayed image unreadable from left side or right side.

However, existing electronic devices are capable of achieving privacy mode only for a specific orientation of the electronic device. The electronic device cannot protect the privacy of the user when the electronic device is rotated, and it fails to meet the privacy needs of the user. For example, mobile devices (such as tablet PC, 2in1 PC, smartphone, etc., but not limited thereto) are used in landscape mode and portrait mode. In such cases, the current privacy function is not sufficient.

Although a device with a whole-direction privacy function can be used, the narrow distribution backlight design is difficult, and it requires a lot of power. The brightness of a whole-direction privacy device while in sharing mode is too high, and its brightness in privacy mode is too low. Although a dual backlight system may be used, the design of the transparent backlight is difficult, and it has a low luminance. The brightness of the dual backlight system in sharing mode is too high, and the brightness of the dual backlight system in privacy mode is too dark.

Therefore, finding a way to solve the above problem has become an important issue.

BRIEF SUMMARY OF THE INVENTION

An embodiment of the present disclosure provides an electronic device. The electronic device includes a privacy module. The privacy module includes a first polarizing element, a second polarizing element, and a light modulation element. The first polarizing element includes a first light absorbing material. The first polarizing element has a surface, and the surface has a normal direction. The second polarizing element includes a second light absorbing material. The second polarizing element at least partially overlaps the first polarizing element. The light modulation element is disposed between the first polarizing element and the second polarizing element. The first light absorbing material has a first long axis, and the second light absorbing material has a second long axis. The first long axis and second long axis are parallel to the normal direction.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Figure 1:
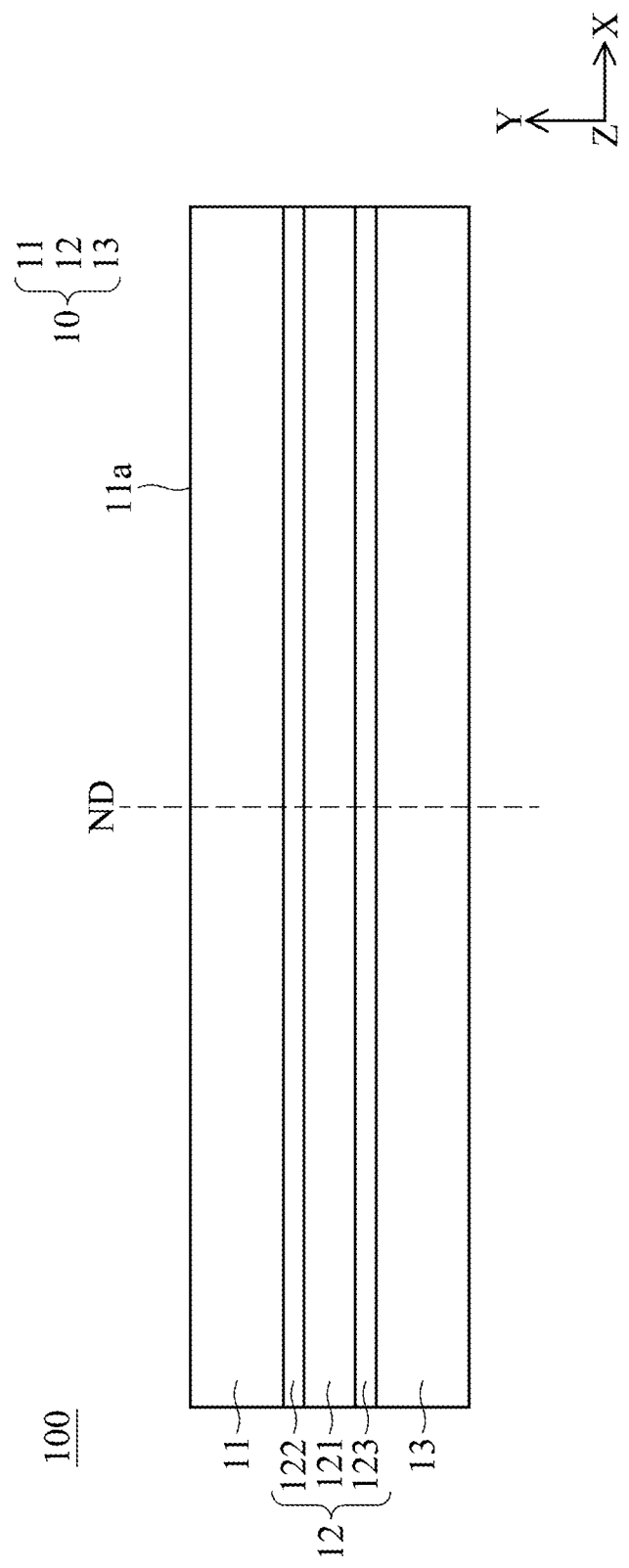
FIG. 1 shows a schematic view of an electronic device according to some embodiments of the present disclosure.

The present disclosure may be more clearly understood by referring to the following description and the appended drawings. It should be noted that, for the sake of the simplicity of the drawings and comprehensibility for readers, only a portion of the light-emitting unit is illustrated in multiple figures in the present disclosure, and the specific components in the figures are not drawn to scale. In addition, the number and size of each component in the drawings merely serve as an example, and are not intended to limit the scope of the present disclosure. Furthermore, similar and/or corresponding numerals may be used in different embodiments for describing some embodiments simply and clearly, but they do not represent any relationship between different embodiments and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open-ended words, so they should be interpreted as meaning "including but not limited to . . . " Therefore, when the terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (i.e. a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

The terms "about," "equal to," "equivalent," "the same as," "essentially," or "substantially" are generally interpreted as within 20% of a given value or range, or as interpreted as within 10%, 5%, 3%, 2%, 1%, or 0.5% of a given value or range.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. If the first value is equal to the second value, the deviation between the first value and the second value may be within about 10%. If the first direction is perpendicular to the second direction, the angle between the first direction and the second direction may be between 80 degrees (≥80 degrees) and 100 degrees (≤100 degrees). If the first direction is parallel to the second direction, the angle between the first direction and the second direction may be between 0 degree (≥0 degree) and 10 degrees (≤10 degrees).

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one having ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Please refer to FIG. 1, which shows a schematic view of an electronic device 100 according to some embodiments of the present disclosure. In some embodiments, the electronic device 100 may be a display device, such as a monitor, a touch display, a curved display, a free shape display, etc., but not limited thereto. In some embodiments, the electronic device 100 may be mounted in other electronic device, such as a smartphone or a tablet, etc., but not limited thereto.

As shown in FIG. 1, the electronic device 100 may include a privacy module 10. The privacy module 10 may include a first polarizing element 11, a light modulation element 12, and a second polarizing element 13. The light modulation element 12 is disposed between the first polarizing element 11 and the second polarizing element 13.

The first polarizing element 11 has a surface 11a, and the surface 11a has a normal direction ND that is perpendicular to the surface 11a. As shown in FIG. 1, the surface 11a may be a surface parallel to X-Z plane, and the normal direction ND may be parallel to the Y-axis.

Moreover, the second polarizing element 13 at least partially overlaps the first polarizing element 11. As shown in FIG. 1, the second polarizing element 13 at least partially overlaps the first polarizing element 11 when viewed along the normal direction ND. In some embodiments, the first polarizing element 11, the light modulation element 12 and the second polarizing element 13 at least overlap each other when viewed along the normal direction ND.

Figure 2:
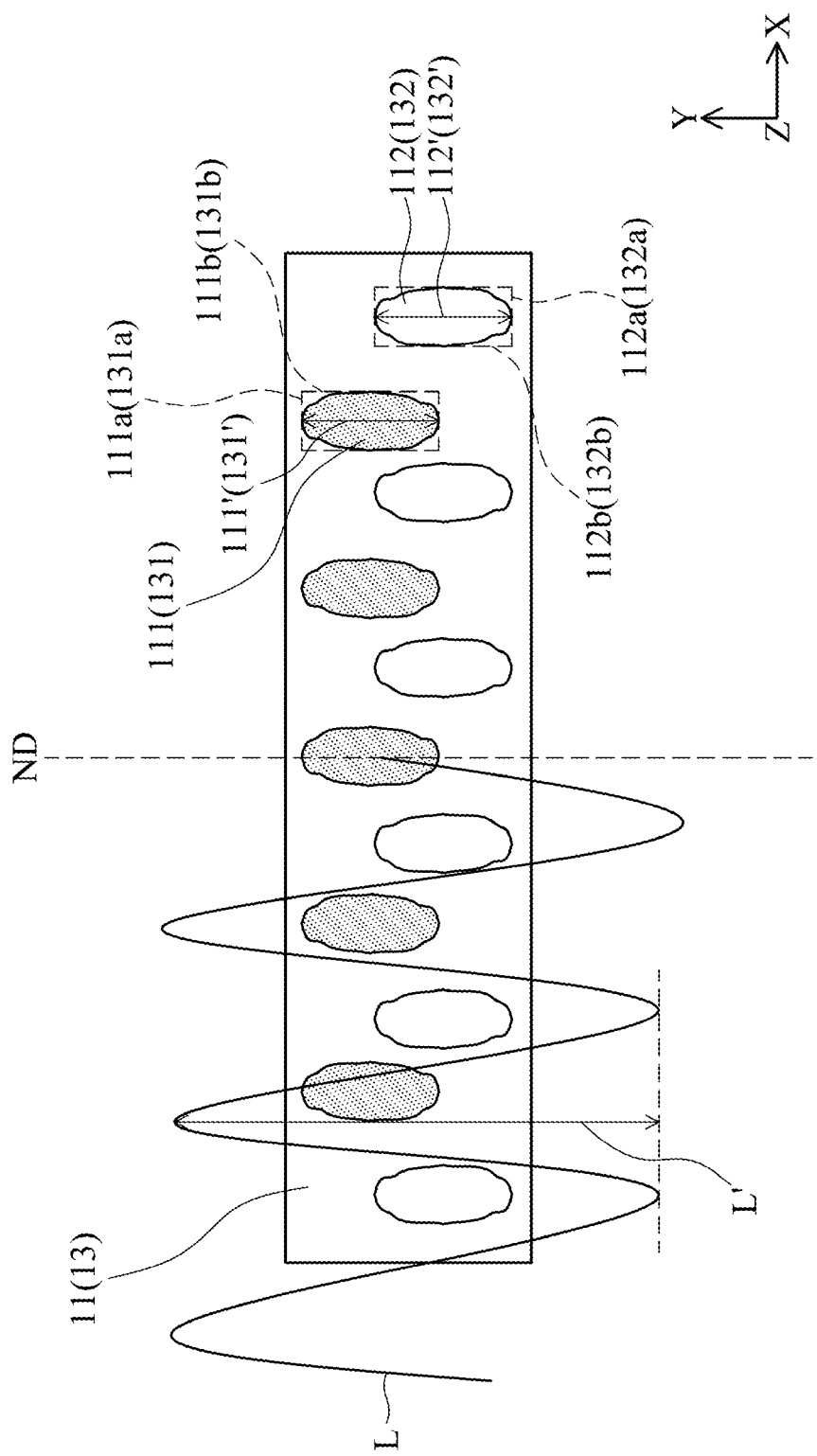
FIG. 2 shows a schematic view of the first polarizing element or the second polarizing element according to some embodiments of the present disclosure.

Please refer to FIG. 2, which shows a schematic view of the first polarizing element 11 or the second polarizing element 13 according to some embodiments of the present disclosure. The first polarizing element 11 may include a first light absorbing material 111 and a liquid crystal 112. The first light absorbing material 111 and the liquid crystal 112 may be substantially ovals. However, please note that the first light absorbing material 111 and the liquid crystal 112 may not be perfect ovals.

The first light absorbing material 111 has a first long axis 111', which is determined to be parallel to the long side 111b of an imaginary rectangle 111a that circumscribes the first light absorbing material 111. The liquid crystal 112 has a first long axis 112', which is determined to be parallel to the long side 112b of an imaginary rectangle 112a that circumscribes the liquid crystal 112.

In some embodiments, the first long axis 111' of the first light absorbing material 111 is parallel to the normal direction ND. In some embodiments, the first long axis 111' of the first light absorbing material 111 and the first long axis 112' of the liquid crystal 112 are parallel to the normal direction ND.

Similarly, the second polarizing element 13 may include a second light absorbing material 131 and a liquid crystal 132. The second light absorbing material 131 and the liquid crystal 132 may be substantially ovals. However, please note that the second light absorbing material 131 and the liquid crystal 132 may not be perfect ovals.

The second light absorbing material 131 has a second long axis 131', which is determined to be parallel to the long side 131b of an imaginary rectangle 131a that circumscribes the second light absorbing material 131. The liquid crystal 132 has a second long axis 132', which is determined to be parallel to the long side 132b of an imaginary rectangle 132a that circumscribes the liquid crystal 132.

In some embodiments, the second long axis 131' of the second light absorbing material 131 is parallel to the normal direction ND. In some embodiments, the second long axis 131' of the second light absorbing material 131 and the second long axis 132' of the liquid crystal 112 are parallel to the normal direction ND.

In some embodiments, the first light absorbing material 111 and the second light absorbing material 131 may be a dichroic dye, a dark dye, a black dye, or a combination thereof. The first light absorbing material 111 may absorb light L with its modulation axis L', which is parallel to the first long axis 111' of the first light absorbing material 111. The second light absorbing material 131 may absorb light L with its modulation axis L', which is parallel to the second long axis 131' of the second light absorbing material 131.

This is, in some embodiments, the light with its modulation axis that is parallel to the normal direction ND may be absorb by the first light absorbing material 111 and the second light absorbing material 131.

As a result, only light with a polarization direction that is perpendicular to the first long axis 111' and whose direction of travel can pass through the first polarizing element 11. Only light with a polarization direction that is perpendicular to the second long axis 131' and whose direction of travel can pass through the second polarizing element 13.

That is, the polarizing directions of the first polarizing element 11 (and the second polarizing element 13) are based on its positions on the first polarizing element 11 (and the second polarizing element 13), and the polarizing directions of the first polarizing element 11 (and the second polarizing element 13) may be different as the position is changed.

Figure 3:
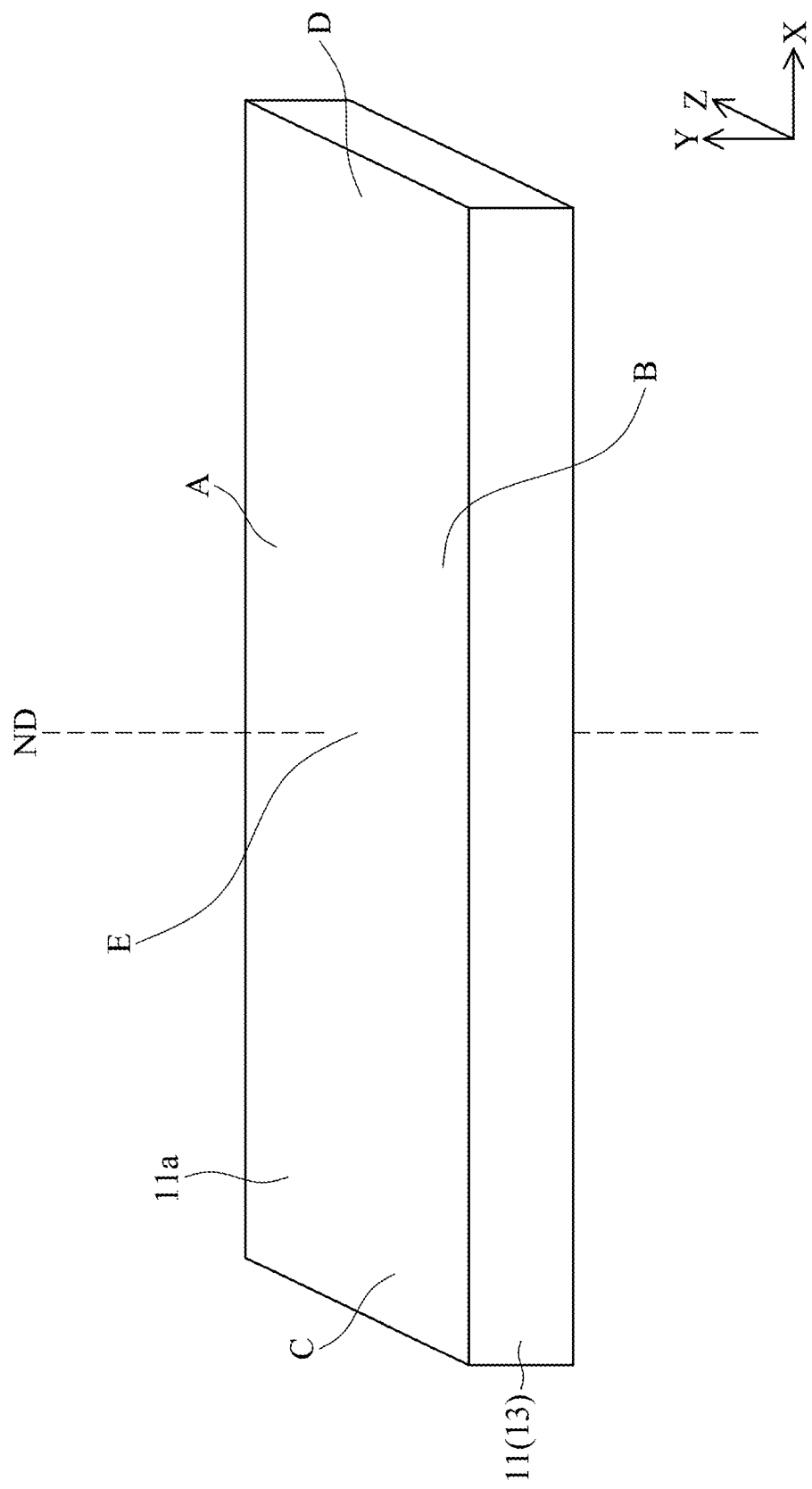
FIG. 3 shows a schematic view of the first polarizing element or the second polarizing element according to some embodiments of the present disclosure.

Please refer to FIG. 3, which shows a schematic view of the first polarizing element 11 or the second polarizing element 13 according to some embodiments of the present disclosure. As shown in FIG. 3, the first polarizing element 11 or the second polarizing element 13 may include side A, side B, side C, side D and center E.

The polarizing direction of the side A, side B, side C, side D and center E may be different and is shown in Table 1.

TABLE 1

| Side of the first polarizing element 11 or the second polarizing element 13 | Polarized direction |
| --- | --- |
| Side A | X-axis |
| Side B | X-axis |
| Side C | Z-axis |
| Side D | Z-axis |
| Center E | Not-polarized |

Please refer back to FIG. 1, the light modulation element 12 may include a light modulation material 121, a first electrode 122 and a second electrode 123. The light modulation material 121 may be disposed between the first electrode 122 and the second electrode 123.

In some embodiments, the light modulation material 121 may include a liquid crystal, such that the light modulation material 121 may rotate the polarization direction of lights that pass through the light modulation material 121.

In some embodiments, the light modulation material 121 may rotate the polarization direction of the lights by 90 degrees. In some embodiments, the light modulation material 121 may rotate the polarization direction of the lights by 15 degrees, 45 degrees, 60 degrees, 75 degrees, 105 degrees, 120 degrees, 135 degrees, 150 degrees, or 165 degrees, etc., but it is not limited thereto.

In some embodiments, the light modulation material 121 may rotate the polarization direction of lights when a voltage is not applied to the light modulation material 121 by the first electrode 122 and the second electrode 123. In some embodiments, the light modulation material 121 may not rotate the polarization direction of lights when a voltage is applied to the light modulation material 121 by the first electrode 122 and the second electrode 123. In some embodiments, the light modulation material 121 may rotate the polarization direction of lights when no voltage is applied to the light modulation material 121 (by the first electrode 122 and the second electrode 123). In some embodiments, the light modulation material 121 may not rotate the polarization direction of lights when the voltage is applied to the light modulation material 121 (by the first electrode 122 and the second electrode 123).

In some embodiments, the light modulation element 12 may include a twisted nematic mode liquid crystal cell (TN-mode LC cell), and the retardation of the twisted nematic mode liquid crystal cell may be greater than 350 nm (≥350 nm).

In some embodiments, the light modulation element 12 may include an electrically controlled birefingence mode liquid crystal cell (ECB-mode LC cell), and the retardation of the electrically controlled birefringence mode liquid crystal cell may be about 275 nm. In some embodiments, the retardation of the electrically controlled birefringence mode liquid crystal cell may be between 250 nm (≥250 nm) and 300 nm (≤300 nm).

Figure 4:
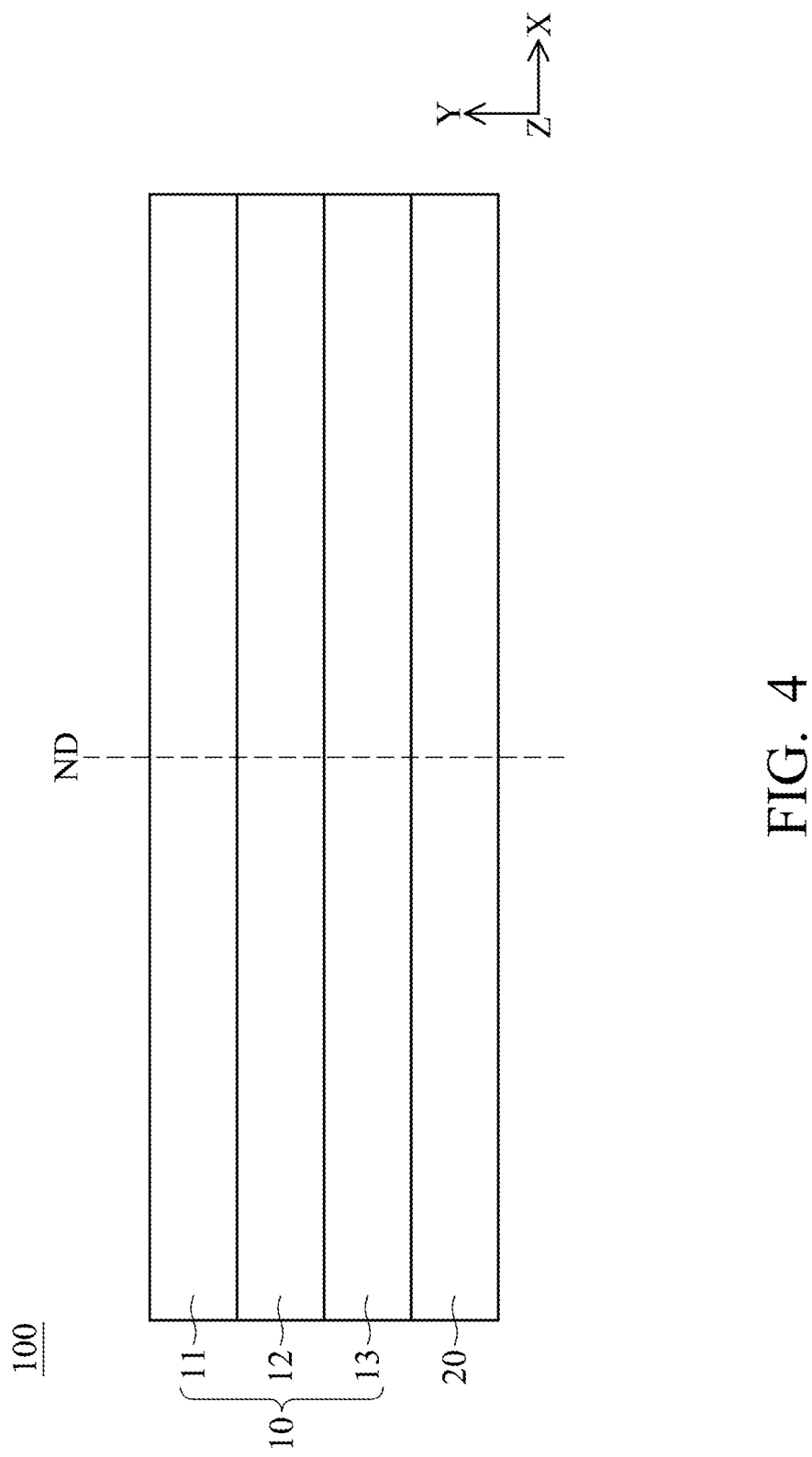
FIG. 4 shows a schematic view of the electronic device according to some embodiments of the present disclosure.

Please refer to FIG. 4, which shows a schematic view of the electronic device 100 according to some embodiments of the present disclosure. As shown in FIG. 4, in some embodiments, the electronic device 100 may include a privacy module 10, a display panel 20. The privacy module 10 may be disposed on the display panel 20.

In some embodiments, the display panel 20 may include a mini light-emitting diode (mini LED), a micro light-emitting diode (micro LED), an organic light-emitting diode (OLED), or a cathode-ray tube (CRT), quantum dots (QDs), a quantum dot diode (QLED/QDLED), an electrophoresis, fluorescence, phosphor, other suitable materials or a combination of the above materials, but not limited thereto.

Figure 5:
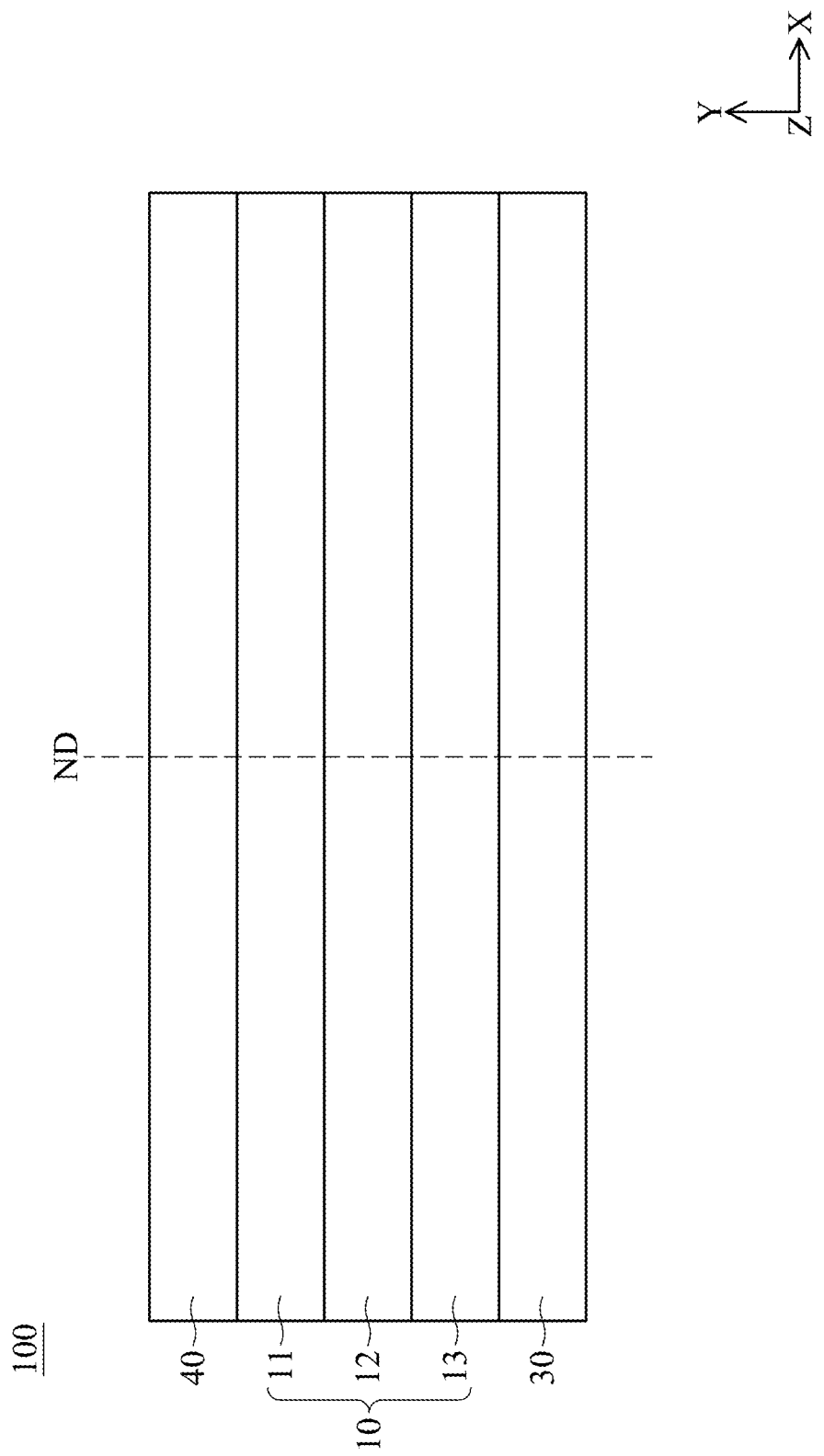
FIG. 5 shows a schematic view of the electronic device according to some embodiments of the present disclosure.

Please refer to FIG. 5, which shows a schematic view of the electronic device 100 according to some embodiments of the present disclosure. As shown in FIG. 5, in some embodiments, the electronic device 100 may include a privacy module 10, an electronic paper (E-paper) with electronic ink (E ink) 30, and a front light 40.

In the embodiments shown in FIG. 5, the privacy module 10 may be disposed between the electronic paper with electronic ink 30 and the front light 40. However, in some other embodiments, the privacy module 10 is not disposed between the electronic paper with electronic ink 30 and the front light 40; instead, although not shown in the figures, the front light 40 may be disposed between the electronic paper with electronic ink 30 and the privacy module 10.

Figure 6:
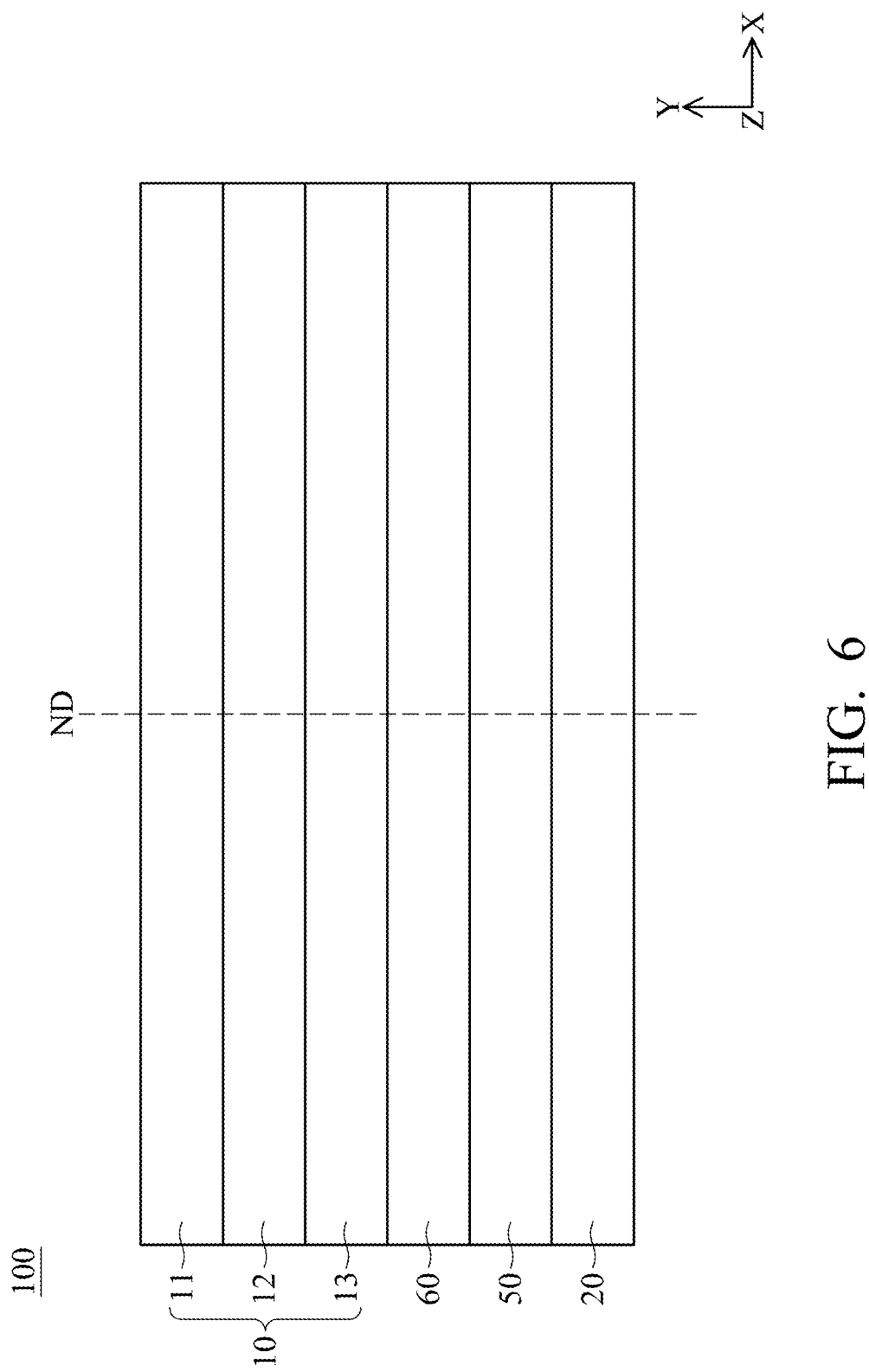
FIG. 6 shows a schematic view of the electronic device according to some embodiments of the present disclosure.

Please refer to FIG. 6, which shows a schematic view of the electronic device 100 according to some embodiments of the present disclosure. As shown in FIG. 6, in some embodiments, the electronic device 100 may include a privacy module 10, a display panel 20, a polarizer 50, and a circular polarizing film 60.

In the embodiments shown in FIG. 6, the polarizer 50 may be disposed between the display panel 20 and the privacy module 10. In some embodiments, the polarizer 50 may be disposed between the display panel 20 and the circular polarizing film 60. In some embodiments, the circular polarizing film 60 may be disposed between the display panel 20 and the privacy module 10. In some embodiments, the circular polarizing film 60 may be disposed between the polarizer 50 and the privacy module 10.

In the embodiments shown in FIG. 6, the circular polarizing film 60 may be a quarter wavelength plate (QWP), or a combination of quarter wavelength plate (QWP) and half wavelength plate (HWP).

In other embodiments, the display panel 20 may be a mini light-emitting diode (mini LED), a micro light-emitting diode (micro LED), an organic light-emitting diode (OLED), or a reflective liquid crystal display (reflective LCD), but not limited thereto. In some embodiment, a front light (not shown) may be added.

Figure 7:
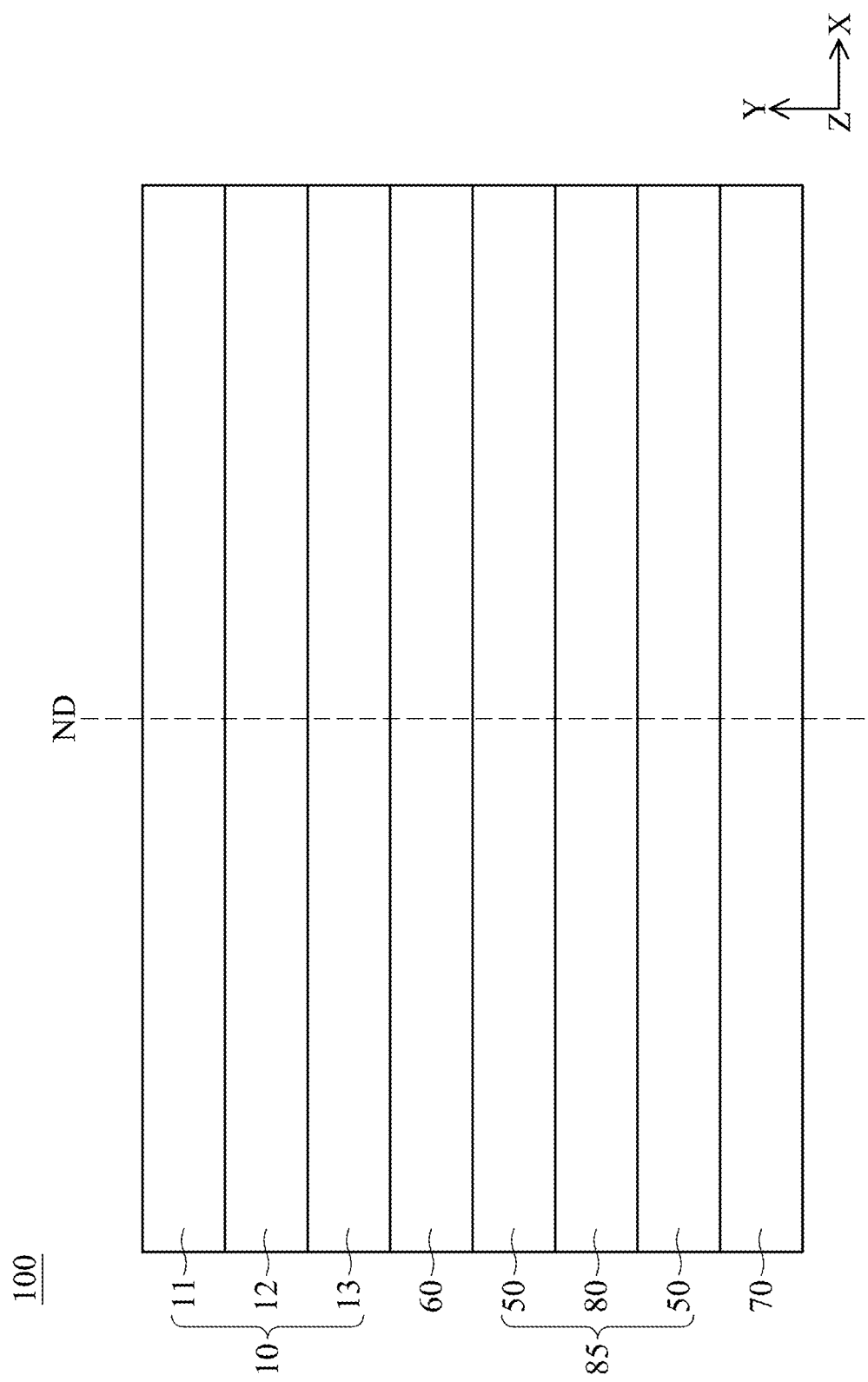
FIG. 7 shows a schematic view of the electronic device according to some embodiments of the present disclosure.

Please refer to FIG. 7, which shows a schematic view of the electronic device 100 according to some embodiments of the present disclosure. In the embodiments shown in FIG. 7, the electronic device 100 may include a transmissive liquid crystal display (transmissive LCD) structure or a transflective liquid crystal display (transflective LCD). As shown in FIG. 7, the electronic device 100 may include a privacy module 10, two polarizers 50, a circular polarizing film 60, a backlight unit 70, and a liquid crystal cell (LC cell) 80. Please note that the liquid crystal cell 80 may be used for imaging.

As shown in FIG. 7, the liquid crystal cell 80 may be disposed between the two polarizers 50, and this configuration may be called as a liquid crystal module 85. In some embodiments, the circular polarizing film 60 may be disposed between the privacy module 10 and the liquid crystal module 85. In some embodiments, the liquid crystal module 85 may be disposed between the privacy module 10 and the backlight unit 70. In some embodiments, the liquid crystal module 85 may be disposed between the circular polarizing film 60 and the backlight unit 70.

In some embodiments, although not shown in the figures, the privacy module 10 may be disposed between liquid crystal module 85 and the backlight unit 70. In some embodiments, the privacy module 10 may be disposed between the circular polarizing film 60 and the backlight unit 70.

Figure 8:
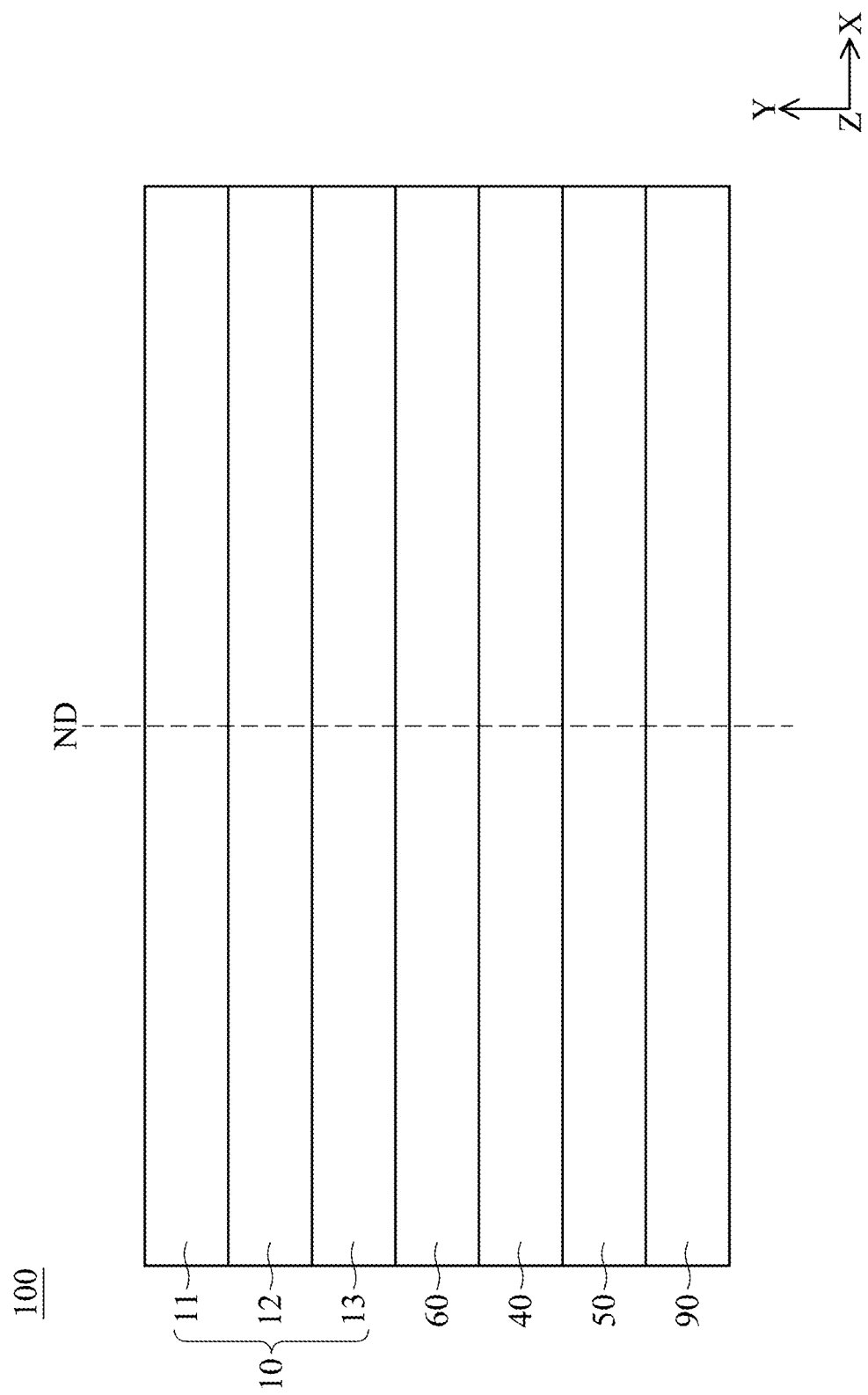
FIG. 8 shows a schematic view of the electronic device according to some embodiments of the present disclosure.

Please refer to FIG. 8, which shows a schematic view of the electronic device 100 according to some embodiments of the present disclosure. In the embodiments shown in FIG. 8, the electronic device 100 may include a privacy module 10, a front light 40, a polarizer 50, a circular polarizing film 60, and a reflective liquid crystal display (reflective LCD) 90.

As shown in FIG. 8, the polarizer 50 may be disposed between the front light 40 and the reflective liquid crystal display 90. In some embodiments, the front light 40 may be disposed between the circular polarizing film 60 and the polarizer 50. In some embodiments, the circular polarizing film 60 may be disposed between the privacy module 10 and the front light 40.

In some other embodiments, although not shown in the figures, the polarizer 50 may be disposed between the circular polarizing film 60 and the reflective liquid crystal display 90. In some embodiments, the circular polarizing film 60 may be disposed between the privacy module 10 and the polarizer 50. In some embodiments, the privacy module 10 may be disposed between the front light 40 and the circular polarizing film 60.

According to other embodiments, the electronic device may include other configurations. In some embodiments, the electronic device may include a privacy module, display panel, a polarizer, and a second light modulation element. The polarizer may be disposed between the second light modulation element and the display panel. The second light modulation element may be disposed between the privacy module and the display panel. The second light modulation element may be disposed between the privacy module and the polarizer.

In some embodiments, the second light modulation element may include a second light modulation material, a third electrode, and a fourth electrode. In some embodiments, the second light modulation material may be disposed between the third electrode and the fourth electrode. In some embodiments, the second light modulation material may include a liquid crystal.

In some embodiments, the second light modulation material may rotate the polarization direction of the lights at left side (may be considered to be similar to the side C in FIG. 3) and right side (may be considered to be similar to the side D in FIG. 3) of the second light modulation material by 90 degrees. In some embodiments, the second light modulation material may rotate the polarization direction of the lights at left side and right side of the second light modulation material by 15 degrees, 45 degrees, 60 degrees, 75 degrees, 105 degrees, 120 degrees, 135 degrees, 150 degrees, or 165 degrees, etc., but not limited thereto.

In some embodiments, the second light modulation material may rotate the polarization direction of the lights at top side (may be considered to be similar to the side A in FIG. 3) and down side (may be considered to be similar to the side B in FIG. 3) of the second light modulation material by 90 degrees. In some embodiments, the second light modulation material may rotate the polarization direction of the lights at top side and down side of the second light modulation material by 15 degrees, 45 degrees, 60 degrees, 75 degrees, 105 degrees, 120 degrees, 135 degrees, 150 degrees, or 165 degrees, etc., but not limited thereto.

In some embodiments, the second light modulation material may rotate the polarization direction of lights when a voltage is applied to the second light modulation material by the third electrode and the fourth electrode. In some embodiments, the second light modulation material may not rotate the polarization direction of lights when no voltage is applied to the second light modulation material (by the third electrode and the fourth electrode).

In some embodiments, the liquid crystal of the second light modulation material may be inclined when the voltage is applied to the second light modulation material. In some embodiments, the inclination angle of the liquid crystal may be between 60 degrees (≥60 degrees) and 80 degrees (≤80 degrees) when the voltage is applied to the second light modulation element.

In some embodiments, the second light modulation element may include an electrically controlled birefingence mode liquid crystal cell (ECB-mode LC cell), and the retardation of the electrically controlled birefingence mode liquid crystal cell is between 400 nm (≥400 nm) and 1500 nm (≤1500 nm). In some embodiments, the rubbing direction is between 0 degree (≥0 degree) and 180 degrees (≤180 degrees). In some embodiments, the rubbing direction is between 90 degree (≥90 degree) and 270 degrees (≤270 degrees).

In the case of electrically controlled birefingence mode liquid crystal cell, please note that the inclination angle of the liquid crystal may be the angle between the long axis (may refer to FIG. 2 and the corresponding description) of the liquid crystal and the surface of the second light modulation material. In some embodiments, the inclination angle of the liquid crystal may be the angle between the long axis of the liquid crystal and X-Z plane.

In some embodiments, the second light modulation element may include a hybrid mode liquid crystal cell, and a retardation of the hybrid mode liquid crystal cell is between 400 nm (≥400 nm) and 1500 nm (≤1500 nm). In some embodiments, the rubbing direction is between 0 degree (≥0 degree) and 180 degrees (≤180 degrees). In some embodiments, the rubbing direction is between 90 degree (≥90 degree) and 270 degrees (≤270 degrees).

According to other embodiments, the electronic device may include other configurations. In some embodiments, the electronic device may include a privacy module, a backlight unit, a liquid crystal cell (LC cell), and a liquid crystal module. The liquid crystal module may include two polarizers and a liquid crystal cell for imaging, and the liquid crystal cell for imaging may be disposed between the two polarizers.

In some embodiments, the privacy module may be disposed between the liquid crystal cell and the backlight unit. In some embodiments, the liquid crystal cell may be disposed between the liquid crystal module and the privacy module.

In some embodiments, the liquid crystal module may be disposed between the liquid crystal cell and the backlight unit. In some embodiments, the liquid crystal cell may be disposed between the privacy module and the liquid crystal module.

According to other embodiments, the electronic device may include other configurations. In some embodiments, the electronic device may include a privacy module, a display panel, a polarizer, a liquid crystal cell. In some embodiments, the display panel may be an organic light-emitting diode (OLED), a mini light-emitting diode (mini LED), a micro light-emitting diode (micro LED), or a reflective liquid crystal display (reflective LCD), but not limited thereto.

In some embodiments, the polarizer may be disposed between the liquid crystal cell and the display panel. In some embodiments, the liquid crystal cell may be disposed between the privacy module and the polarizer.

According to other embodiments, the electronic device may include other configurations. In some embodiments, the electronic device may include a privacy module, a display panel, a front light, a polarizer, a liquid crystal cell. In some embodiments, the display panel may be a reflective liquid crystal display (reflective LCD), but not limited thereto.

In some embodiments, the polarizer may be disposed between the front light and the display panel. In some embodiments, the front light may be disposed between the liquid crystal cell and the polarizer. In some embodiments, the liquid crystal cell may be disposed between the privacy module and the front light.

In some embodiments, the polarizer may be disposed between the liquid crystal cell and the display panel. In some embodiments, the liquid crystal cell may be disposed between the privacy module and the polarizer. In some embodiments, the privacy module may be disposed between the front light and the liquid crystal cell.

In conclusion, the embodiments of the present disclosure provide an electronic device with a privacy module. The privacy module allows only the observer to view the content of the electronic device from the front, and avoid the other observers from viewing the content of the electronic device from the sides. As a result, the electronic device has whole-direction privacy, and the electronic device can be used in landscape mode and portrait mode without losing its privacy function.

Moreover, the electronic device with a privacy module of the embodiments of the present disclosure does not need a high current (power) as the other privacy devices. The electronic device with a privacy module of the embodiments of the present disclosure needs only an ordinary current (power) for the light sources (may be the display panel, E-ink, LEDs, LCDs, or the light sources mentioned above) since only the light at the sides are absorbed. Therefore, the electronic device with a privacy module of the embodiments of the present disclosure may save the power, and the life of the electronic device itself is longer than other privacy devices.

In addition, the electronic device with a privacy module of the embodiments of the present disclosure needs no additional backlight units or diffusion units, and thus the electronic device with a privacy module of the embodiments of the present disclosure is compact, and its cost can be reduced.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An electronic device, comprising:
a display panel,
a privacy module, disposed on the display panel, comprising:
a first polarizing element, comprising a first light absorbing material, wherein the first polarizing element has a surface, and the surface has a normal direction;
a second polarizing element, comprising a second light absorbing material, wherein the second polarizing element at least partially overlaps the first polarizing element; and
a light modulation element, disposed between the first polarizing element and the second polarizing element, and
a second light modulation element, disposed between the display panel and the privacy module,
wherein the first light absorbing material has a first long axis, and the second light absorbing material has a second long axis, and
wherein the first long axis and second long axis are parallel to the normal direction.

2. The electronic device as claimed in claim 1, wherein the first long axis is parallel to a long side of an imaginary rectangle that circumscribes the first light absorbing material, and
wherein the second long axis is parallel to a long side of an imaginary rectangle that circumscribes the second light absorbing material.

3. The electronic device as claimed in claim 2, wherein the first polarizing element and the second polarizing element comprise liquid crystals.

4. The electronic device as claimed in claim 3, wherein the first light absorbing material of the first polarizing element and the second light absorbing material of the second polarizing element comprise dichroic dyes, dark dyes, black dyes, or a combination thereof.

5. The electronic device as claimed in claim 1, wherein the light modulation element comprises a first electrode, a second electrode and a light modulation material, and
wherein the light modulation material is disposed between the first electrode and the second electrode.

6. The electronic device as claimed in claim 5, wherein the light modulation material comprises a liquid crystal.

7. The electronic device as claimed in claim 5, wherein the light modulation material rotates the polarization direction of lights when no voltage is applied to the light modulation material, and wherein the light modulation material does not rotate the polarization direction of lights when a voltage is applied to the light modulation material.

8. The electronic device as claimed in claim 7, wherein the voltage that is applied to the light modulation material is exerted by the first electrode and the second electrode.

9. The electronic device as claimed in claim 7, wherein the polarization direction of lights is rotated by 90 degrees by the light modulation material.

10. The electronic device as claimed in claim 1, wherein the light modulation element comprises a twisted nematic mode liquid crystal cell,
wherein retardation of the twisted nematic mode liquid crystal cell is greater than 350 nm.

11. The electronic device as claimed in claim 1, wherein the light modulation element comprises an electrically controlled birefingence mode liquid crystal cell,
wherein retardation of the electrically controlled birefingence mode liquid crystal cell is between 250 nm and 300 nm.

12. The electronic device as claimed in claim 1, further comprising a circular polarizing film,
wherein the circular polarizing film is disposed between the display panel and the privacy module.

13. The electronic device as claimed in claim 1, wherein the second light modulation element comprises an electrically controlled birefingence mode liquid crystal cell,
wherein retardation of the electrically controlled birefingence mode liquid crystal cell is between 400 nm and 1500 nm.

14. The electronic device as claimed in claim 1, wherein the second light modulation element comprises a hybrid mode liquid crystal cell,
wherein retardation of the hybrid mode liquid crystal cell is between 400 nm and 1500 nm.

15. The electronic device as claimed in claim 1, wherein the second light modulation element comprises a third electrode, a fourth electrode and a second light modulation material,
wherein the second light modulation material is disposed between the third electrode and the fourth electrode.

16. The electronic device as claimed in claim 15, wherein the second light modulation material comprises a liquid crystal.

17. The electronic device as claimed in claim 16, wherein the liquid crystal of the second light modulation material is inclined when no voltage is applied to the second light modulation material,
wherein the liquid crystal of the second light modulation material is not inclined when a voltage is applied to the second light modulation material, and
wherein the voltage that is applied to the second light modulation material is exerted by the third electrode and the fourth electrode.

18. The electronic device as claimed in claim 17, wherein inclination angle of the liquid crystal is between 60 degrees and 80 degrees when no voltage is applied to the second light modulation element.

\* \* \* \* \*